United States Patent
Gawell et al.

(10) Patent No.: US 11,725,559 B2
(45) Date of Patent: Aug. 15, 2023

(54) EXHAUST ADDITIVE DOSING SYSTEM COMPRISING A TURBOCHARGER

(71) Applicant: Scania CV AB, Södertälje (SE)

(72) Inventors: Anders Gawell, Stjärnhov (SE); Viktor Olsson, Johanneshov (SE); Magnus Lindgren, Älvsjö (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/783,313

(22) PCT Filed: Nov. 26, 2020

(86) PCT No.: PCT/SE2020/051132
§ 371 (c)(1),
(2) Date: Jun. 8, 2022

(87) PCT Pub. No.: WO2021/118428
PCT Pub. Date: Jun. 17, 2021

(65) Prior Publication Data
US 2023/0019174 A1    Jan. 19, 2023

(30) Foreign Application Priority Data
Dec. 12, 2019   (SE) .................... 1951436-3

(51) Int. Cl.
*F01N 3/00* (2006.01)
*F01N 3/20* (2006.01)
(Continued)

(52) U.S. Cl.
CPC ........... *F01N 3/206* (2013.01); *F01N 3/2066* (2013.01); *F01N 13/141* (2013.01);
(Continued)

(58) Field of Classification Search
CPC ...... F01N 3/206; F01N 3/2066; F01N 13/141; F01N 13/1838; F01N 2340/06;
(Continued)

(56) References Cited

U.S. PATENT DOCUMENTS 6,883,308 B2 * 4/2005 Megas .................. F01N 3/2066
60/303
8,297,050 B2 * 10/2012 Ranganathan ............ F01N 3/36
60/297
(Continued)

FOREIGN PATENT DOCUMENTS

CN    112539101 A  *  3/2021  ........... F01N 3/2066
DE    102008043726 A1    5/2009
(Continued)

OTHER PUBLICATIONS

Scania CV AB, International Patent Application No. PCT/SE2020/051132, International Preliminary Report on Patentability, dated May 17, 2022.
(Continued)

*Primary Examiner* — Matthew T Largi
(74) *Attorney, Agent, or Firm* — Moore & Van Allen PLLC; W. Kevin Ransom

(57) ABSTRACT

Disclosed is a turbocharger for an internal combustion engine comprising a turbine having a turbine housing and a diffusor. The turbine housing comprises an exhaust gas outlet volume, and the diffusor is arranged in this volume. A housing orifice and a diffusor orifice are arranged through each of the turbine housing and diffusor respectively and are mutually aligned to provide an opening into the exhaust gas outlet volume. The turbocharger further comprises a bushing arranged within the housing orifice and extending towards the diffusor orifice and ending at a first end in association with the diffusor orifice. The first end of bushing has an
(Continued)

internal diameter that is greater than or equal to a diameter of the diffusor orifice.

20 Claims, 4 Drawing Sheets

(51) Int. Cl.
  *F02B 37/00*   (2006.01)
  *F02B 39/00*   (2006.01)
  *F01N 13/14*   (2010.01)
  *F01N 13/18*   (2010.01)

(52) U.S. Cl.
  CPC .......... *F01N 13/1838* (2013.01); *F02B 37/00* (2013.01); *F02B 39/00* (2013.01); *F01N 2340/06* (2013.01); *F01N 2610/14* (2013.01); *F01N 2610/1453* (2013.01)

(58) Field of Classification Search
  CPC ......... F01N 2610/14; F01N 2610/1453; F02B 37/00; F02B 39/00; F02D 41/0007; F02D 23/00; F02M 35/10157; F02M 26/05; F02M 26/23; F02M 26/06
  See application file for complete search history.

(56) References Cited

U.S. PATENT DOCUMENTS

| | | | | |
|---|---|---|---|---|
| 9,790,829 | B2 * | 10/2017 | Kawashima | ........ F01N 13/1805 |
| 10,024,213 | B2 | 7/2018 | Mitchell et al. | |
| 2007/0163241 | A1 * | 7/2007 | Meingast | ............ B01F 23/2132 |
| | | | | 60/301 |
| 2007/0175204 | A1 * | 8/2007 | Shirai | ................ B01D 53/9431 |
| | | | | 60/301 |
| 2008/0014103 | A1 * | 1/2008 | Cooke | .................. F04B 17/048 |
| | | | | 417/410.1 |
| 2008/0022663 | A1 | 1/2008 | Dodge et al. | |
| 2009/0084094 | A1 * | 4/2009 | Goss | ..................... F01N 13/009 |
| | | | | 60/301 |
| 2009/0158717 | A1 * | 6/2009 | Kimura | ................... F01N 13/08 |
| | | | | 60/299 |
| 2010/0319342 | A1 * | 12/2010 | Brown | .................... F01N 3/035 |
| | | | | 60/299 |
| 2014/0363357 | A1 * | 12/2014 | Trivedi | ................. F01N 3/2066 |
| | | | | 165/104.11 |
| 2016/0047288 | A1 * | 2/2016 | Arrowsmith | ........... F01N 3/206 |
| | | | | 60/274 |
| 2017/0087514 | A1 * | 3/2017 | Daoud | ................. F01N 3/2892 |
| 2020/0123950 | A1 * | 4/2020 | Kemmerling | ........... F01N 3/206 |

FOREIGN PATENT DOCUMENTS

| | | | | |
|---|---|---|---|---|
| DE | 102014015868 | A1 | 4/2016 | |
| EP | 1712754 | A1 | 10/2006 | |
| EP | 1715153 | A1 | 10/2006 | |
| FR | 2897646 | A3 | 8/2007 | |
| GB | 2602090 | A * | 6/2022 | ......... F01N 13/1827 |
| GB | 2602098 | A * | 6/2022 | ............ F01N 3/206 |
| JP | 2009114934 | A | 5/2009 | |
| SE | 1651396 | A1 | 4/2018 | |
| WO | 2015130640 | A1 | 9/2015 | |
| WO | 2018080371 | A1 | 5/2018 | |

OTHER PUBLICATIONS

Scania CV AB, International Patent Application No. PCT/SE2020/051132, International Search Report, dated Dec. 17, 2020.
Scania CV AB, International Patent Application No. PCT/SE2020/051132, Written Opinion, dated Dec. 17, 2020.
Scania CV AB, Swedish Patent Application No. 1951436-3, Office Action, dated May 29, 2020.
Scania CV AB, Swedish Patent Application No. 1951436-3, Office Action, dated Dec. 15, 2020.

* cited by examiner

EXHAUST ADDITIVE DOSING SYSTEM COMPRISING A TURBOCHARGER

CROSS-REFERENCE TO RELATED APPLICATIONS

This application is a National Stage Patent Application (filed under 35 § U.S.C. 371) of PCT/SE2020/051132, filed Nov. 26, 2020, of the same title, which, in turn claims priority to Swedish Patent Application No. 1951436-3 filed Dec. 12, 2019, of the same title; the contents of each of which are hereby incorporated by reference.

FIELD OF THE INVENTION

The present disclosure relates to a turbocharger for an internal combustion engine. The present disclosure also relates to an exhaust additive dosing system for an exhaust system for an internal combustion engine, the said exhaust additive dosing system comprising such a turbocharger. The disclosure further relates to a vehicle comprising such a turbocharger or exhaust additive dosing system.

BACKGROUND OF THE INVENTION

Emissions standards for motor vehicles are becoming increasingly stringent. Such standards typically specify maximum emission levels for a number of tailpipe pollutants including carbon monoxide (CO), hydrocarbons (HC), nitrogen oxides ($NO_x$) and particulate matter (PM). In order to meet the requirements of the present and presumably future standards, vehicles are required to be equipped with emissions reduction technologies.

Selective catalytic reduction (SCR) is an effective technology to reduce tailpipe nitrogen oxides ($NO_x$) emissions. It involves adding a reductant, such as ammonia, to the vehicle exhaust stream. The reductant, with the aid of a catalyst, reduces NO in the exhaust stream to nitrogen gas ($N_2$) and water. In practical implementations in motor vehicles, an aqueous urea solution is used as a reductant and this urea solution is decomposed to ammonia and carbon dioxide in the hot exhaust stream.

It is desirable to be able to remove substantially all NO from the exhaust stream using only SCR. However, this is not without difficulties. In order to produce the quantities of ammonia required to reduce substantially all $NO_x$, large quantities of urea solution must be injected into the exhaust stream. If the exhaust stream is sufficiently hot, the solution will evaporate and decompose to ammonia. The exact temperature that this occurs at depends on the injected mass flow of urea: the greater the mass flow, the higher the temperature required. At sub-optimal temperatures the urea solution may instead form deposits on surfaces of the exhaust conduit. Such deposits may include crystallized urea, as well as urea decomposition by-products such as cyanuric acid. These deposits can be removed by heating the exhaust system at temperatures approaching 400° C., but such temperatures are rarely achieved during normal operation of the vehicle and therefore, special procedures must be adopted to remove the exhaust deposits.

A further difficulty with SCR is the requirement for efficient mixing in order to achieve uniform distribution of reductant over the entire surface area of multiple SCR catalyst substrates. The space available for mixing is extremely limited and the reductant is commonly injected into the exhaust stream shortly upstream of the SCR catalyst substrates. In order to improve mixing a mixing device, often resembling a turbine blade, is arranged in the exhaust pipe. However, even when using a mixing device, it is difficult to achieve sufficiently uniform mixing. Moreover, the presence of a mixing device in the exhaust pipe acts as an obstruction to flow, causing higher pressure upstream of the mixer (backpressure) and reducing the engine efficiency.

These problems may be addressed by providing injection of the reductant further upstream in the exhaust system, for example in conjunction with a turbocharger turbine arranged in the exhaust system.

Document WO 2018/080371 discloses an exhaust additive dosing system for a turbocharger turbine. A distribution device is arranged on a shaft or hub of the turbocharger turbine. A metering device is arranged to supply exhaust additive to the distribution device. Since the distribution device sits in the wake created by the turbine, exhaust additive is easily dosed to the distribution device without needing to overcome the high exhaust flow velocities present closer to the outlet walls of the turbine. Exhaust additive dosed to the distribution device is dispersed in the exhaust stream by utilizing the centrifugal force of the spinning turbine.

There remains a need for an improved means of adding a reductant to an exhaust stream.

SUMMARY OF THE INVENTION

The inventors of the present invention have identified a number of shortcomings with regard to prior art solutions for dosing reductant at the outlet of a turbocharger turbine. Urea and by-products therefrom are corrosive to the material of the turbine housing, especially at the high temperatures prevailing during operation. Arrangement of a diffuser cone in the outlet of the turbine housing may assist in preventing contact between the dosed urea and the turbine housing. However, in order to provide a dosing pipe of the metering device with access to the outlet of the turbine, it is necessary to provide a hole in the diffusor. This creates a leakage path for the urea into the turbine housing. Due to the thermal conditions prevailing in the turbine housing, as well as for reasons of manufacturability and ease of assembly, it is very difficult to provide an effective seal between the dosing pipe and the diffusor in order to prevent leakage.

It would be advantageous to achieve a means of overcoming, or at least alleviating, at least some of the above mentioned shortcomings. In particular, it would be desirable to enable a dosing system that ameliorates the risk of urea leaking into the turbine housing when dosing urea in the outlet of a turbocharger. To better address one or more of these concerns, a turbocharger, exhaust additive dosing system and vehicle having the features defined in the independent claim is provided.

The turbocharger comprises a turbine. The turbine comprises a turbine housing and a diffusor. The turbine housing comprises an exhaust gas outlet volume, and the diffusor is arranged in this volume. A housing orifice and a diffusor orifice are arranged through each of the turbine housing and diffusor respectively, and are mutually aligned to provide an opening into the exhaust gas outlet volume.

The turbocharger further comprises a bushing. The bushing is arranged within the housing orifice, extends towards the diffusor orifice, and ends at a first end in association with the diffusor orifice. The first end of bushing has an internal diameter that is greater than or equal to a diameter of the diffusor orifice.

By providing a suitably-dimensioned bushing between the diffusor orifice and housing orifice, it is ensured that any reductant leaking through the diffusor orifice will be collected in within the bushing, where it may evaporate in due course. Such an arrangement prevents contact between the corrosive reductant and the turbine housing.

The diffusor may comprise an orifice collar arranged to partially or fully encircle the diffusor orifice and arranged to interface with an outer wall of the bushing. This assists in sealing between the diffusor and bushing, as well as assists in correctly positioning the bushing and diffusor during assembly of the turbocharger. The orifice collar may be arranged to provide a labyrinth seal between the diffusor and the first end of the bushing. The orifice collar may thus provide a sufficient seal between the diffusor and the bushing, thereby lessening or eradicating any need for a separate sealing element.

A sealing element may be arranged to provide a seal between the diffusor and the first end of the bushing. A sealing element may assist in providing an improved seal between the diffusor and the bushing, especially when the bushing is arranged at an angle that is not perpendicular to the wall of the diffusor at the location of the diffusor orifice. The sealing element may be adapted to provide a labyrinth seal between the diffusor and the bushing. Such seals can be effectively implemented even at the high temperatures prevailing in the turbocharger turbine. The sealing element may be a gasket.

The turbocharger may further comprise a distribution device arranged on a shaft, hub or rotor of the turbine. Such a distribution device assists in effective distribution of the reductant in the exhaust system. The distribution device may be manufactured integrally with the shaft, hub or rotor of the turbocharger turbine.

The bushing may be manufactured of stainless steel. This prevents corrosion due to contact with reductant. The turbine housing may be manufactured of cast iron. Thus, a housing material with appropriate thermal, mechanical and manufacturing properties may be used, without undue concern with regard to the anti-corrosive properties of the material.

The bushing may comprise a bushing flange arranged at a second end of the bushing, the second end being arranged opposite to the first end of the bushing. Such a flange may provide a suitable interface with both the turbine housing and a dosing pipe inserted within the bushing. The bushing flange may be adapted at a first face to interface with the turbine housing such that displacement of the bushing further into the exhaust gas outlet volume is prevented. This assists in assembly of the turbocharger and reduces the risk of incorrect insertion of the bushing.

According to another aspect of the invention, the objects of the invention are achieved by an exhaust additive dosing system according to the appended claims.

The exhaust additive dosing system comprises a turbocharger as defined herein, and an exhaust additive metering device (26). The exhaust additive metering device comprises a dosing pipe arranged to supply exhaust additive to the exhaust gas outlet volume of the turbocharger. The dosing pipe comprises a surface arranged to sealably interact with a surface of the bushing. In this manner, the dosing pipe and bushing together define a container for the collection of leaked reductant.

The dosing pipe may comprise a pipe flange arranged to sealably interact with a second face of the bushing flange, wherein the second face is arranged opposite the first face of the bushing flange. This provides a simple means of providing a sealed interface between the bushing and the dosing pipe.

The exhaust additive dosing system may comprise a distribution device arranged on a shaft, hub, or rotor of the turbine. The exhaust additive metering device may be arranged to supply exhaust additive to the exhaust additive distribution device. Such a combination of metering device and distribution device provides a particularly simple and effective distribution of reductant in the exhaust stream.

According to a further aspect of the invention, the objects of the invention are achieved by a vehicle comprising a turbocharger or exhaust additive dosing system as defined herein.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

Figure 1:
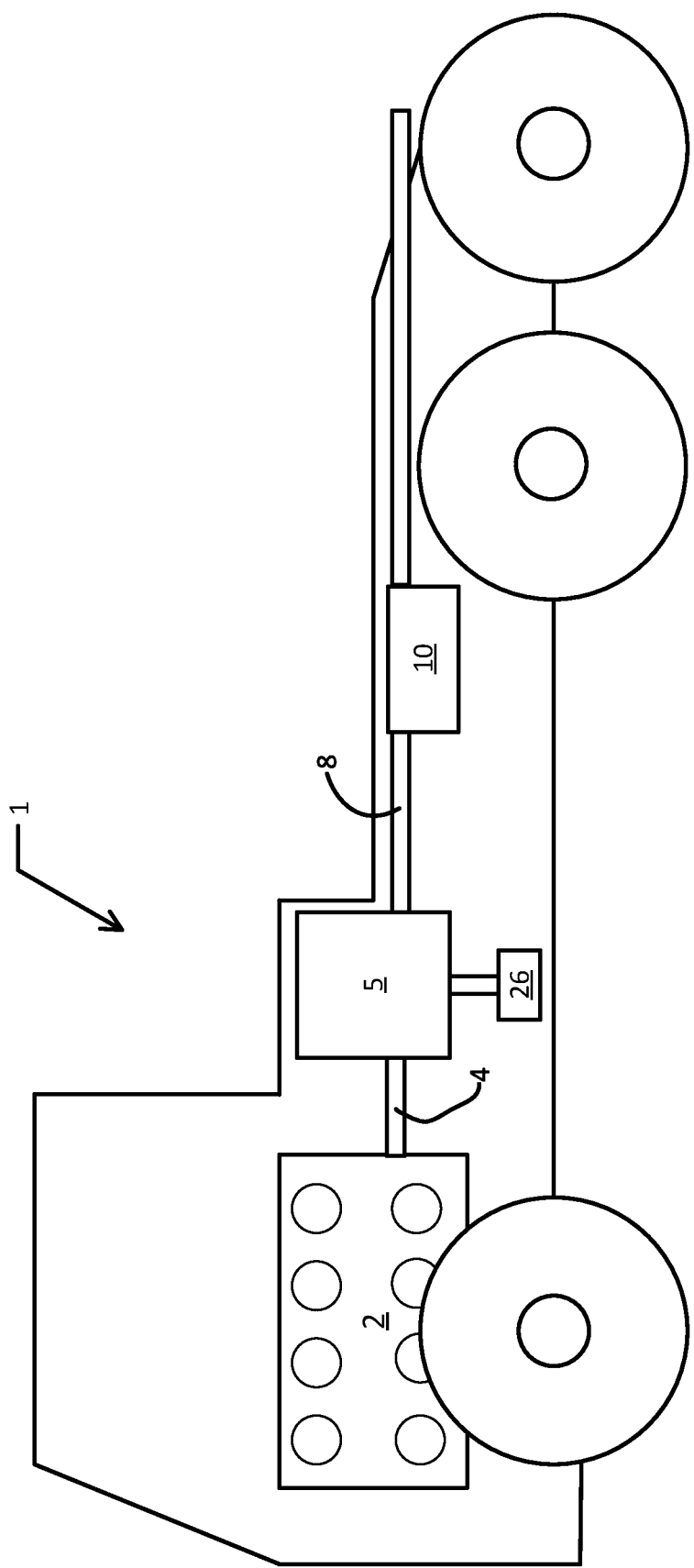
FIG. 1 schematically illustrates a vehicle comprising an exhaust system according to an embodiment of the present invention.

The additive dosing system of the present disclosure is located in the exhaust system for an internal combustion engine. The internal combustion engine may be any internal combustion engine, but is preferably a four-stroke combustion engine, even more preferably a compression ignition four-stroke combustion engine. The engine may be used in any application commonly known for internal combustion engines. It may for example be retailed as a free-standing engine, for use for example in power generation or industrial settings. However, application in a vehicle is preferred. By vehicle it is meant any machine utilizing an internal combustion engine to provide motive force, either directly, or indirectly as in the case of series hybrid vehicles. This includes, but is not limited to, motor vehicles such as cars, trucks and buses; railed vehicles such as trains and trams; watercraft such as ships and boats; and aircraft. The exhaust additive is preferably a reductant, even more preferably diesel exhaust fluid comprising a solution of urea in water, in accordance with standard AUS 32 of ISO 22241. However, the exhaust additive may also be another liquid additive added to the exhaust stream, such as hydrocarbon fuel to "burn off" a diesel particulate filter arranged downstream in the exhaust system. However, henceforth the exhaust additive will be referred to simply as "reductant".

The exhaust system is equipped with a turbocharger for recovering energy from the exhaust gases. The turbocharger comprises a turbine rotor housed in a turbine housing. A shaft connects the turbine rotor to the impeller of a compressor for compressing the charge air of the internal combustion engine. This shaft may traverse the turbine rotor, in which case the end of the turbine shaft extends outwardly at the outlet side of the turbine rotor, or the shaft may terminate at a hub of the turbine rotor, within the turbine.

The reductant dosing system is located in association with the turbocharger turbine. The dosing system comprises a metering device and preferably a distribution device. The metering device is arranged to convey reductant to the exhaust gas outlet volume of the turbine, where the reductant may then be distributed in the exhaust gas leaving the turbine. Preferably this is done in conjunction with a distribution device to facilitate distribution of the reductant, but the metering device may be used without a distribution device, or with an alternative device for improving distribution of reductant in the exhaust stream, such as a mixer.

The distribution device if used may be mounted on the shaft or hub of the turbocharger, coaxially with the shaft, at the outlet side of the shaft or hub. This means that the distribution device spins in unison with the turbocharger shaft and turbine, around a common rotation axis. Preferably the distribution device forms an integral part of the shaft, hub or rotor. If the turbocharger is equipped with a distribution device, the metering device is arranged in conjunction with the distribution device. Its dosing outlet is arranged centrally over or within the distribution device for depositing reductant to the distribution device.

The dosing pipe of the metering device leading to the dosing outlet traverses the wall of the turbine housing at an appropriate location downstream of the turbine rotor. The reductant and/or byproducts thereof are highly corrosive to the material of the turbine housing, which is typically cast iron. In order to avoid contact between the reductant and the turbine housing, the turbine is equipped with a diffusor arranged in the exhaust gas outlet volume of the turbine.

A diffusor may serve many purposes. Primarily, it provides a physical barrier to prevent reductant added to the exhaust gas outlet volume from coming into contact with the turbine housing. To this effect, it is preferred if the diffusor is manufactured from a corrosion-resistant material such as stainless steel. A diffusor may also serve to increase the efficiency of the turbine by providing a smooth transition from dynamic pressure to static pressure for the exhaust gases upon leaving the turbine, as in the case of prior art turbine diffusors. The diffusor may also function as an evaporation device for reductant droplets deposited on surface of the diffusor from the distribution device. The functioning of the diffusor as an evaporation device may be optimized in a number of ways. For example, the diffusor may be treated to optimize the contact angle of reductant droplets with the diffusor surface, and/or may be treated to optimize heat transfer to any deposited reductant droplets.

However, in order to provide the dosing pipe with access to the exhaust gas outlet volume, and in particular to the distribution device mounted axially in the turbine if such a distribution device is used, it is required that the dosing pipe passes through not only the turbine housing, but also the diffusor. Therefore, an orifice or through-hole is required in each of the turbine housing (i.e. housing orifice) and diffusor (i.e. diffusor orifice) to permit access for the dosing pipe. The housing orifice and diffusor orifice should be mutually aligned and suitably dimensioned to permit insertion of the dosing pipe. Due to manufacturing and assembly requirements, as well as the thermal properties of the materials used, it is extremely difficult to provide an adequate seal between the dosing pipe and the diffusor. Therefore, the orifice in the diffusor that the dosing pipe passes through provides a leakage path for reductant or byproducts thereof to come into contact with the turbine housing.

The present invention is based upon an insight by the inventors that it is not necessary to provide a seal between the dosing pipe and the diffusor orifice. Instead, it is sufficient that leakage through the diffusor orifice is confined to a corrosion-resistant volume where it may not come into contact with the turbine housing.

Such a solution is achieved by providing the housing orifice with a bushing or sleeve that extends through the housing orifice and ends in association with the diffusor orifice. By "in association with" it is for example meant abutting, in close proximity to, or forming a sealed interface via a further component with the diffusor orifice. The bushing is manufactured in a corrosion-resistant material such as stainless steel. At the end of the bushing that is in association with the diffusor orifice, a seal may be provided with the diffusor sufficient to ensure that reductant does not escape into the volume between the diffusor and the housing. This is primarily achieved by ensuring that the bushing has an inner diameter that is preferably greater than the diameter of the diffusor orifice, or at least not smaller than the diffusor orifice, and that there is little or no gap between the bushing and the diffusor. For example, the end of the bushing in association with the diffusor hole may partially or fully abut the diffusor. However, further sealing can be provided if required. Further sealing may be achieved by using a sealing element such as a gasket or packing. Because a diffusor is typically frusto-1951436-3conically shaped, a cylindrical bushing arranged normal to the central axis of the turbine and abutting the diffusor at one point will have a small gap between the diffusor and the bushing at the point diametrically opposite the abutting point. A sealing element may be used to bridge and seal this gap, for example by creating a labyrinth seal between the diffusor and bushing. Alternatively, by offsetting the angle of the bushing such that it is normal to the diffusor wall, such a gap may be avoided. Alternatively, or in addition, further sealing may be achieved by equipping the diffusor with a collar extending partially or fully around the diffusor hole on the side arranged to interface with the bushing. Such a collar provides a sealing interface with the bushing and assists in correct positioning of the bushing relative to the diffusor. The collar may be arranged to provide a labyrinth seal between the bushing and diffusor, eliminating in some cases the need for a separate sealing element.

The end of the bushing not in contact with the diffusor may be arranged to sealably interact with the dosing pipe, i.e. form a seal with the dosing pipe either directly or via an intermediate component such as a gasket or sealing element. This may suitably be performed by providing the bushing and the dosing pipe with flanges that abut when assembled. The flange of the bushing also assists accurate positioning of the bushing in the housing and prevents excessive extension into the exhaust outlet volume.

When assembled, the dosing pipe and bushing together form a chamber capable of collecting any reductant leaking through the diffusor orifice. Because this chamber is open to the exhaust gas outlet volume, the temperature prevailing is essentially the same as that prevailing in the exhaust gas outlet volume. This means that any reductant collected in the chamber will be rapidly evaporated and conveyed onwards to the exhaust aftertreatment system together with the exhaust gases.

The reductant metering device of the reductant dosing system may be a liquid-only device, otherwise known as an airless injector. This means that the metering device does not utilize compressed air in order to facilitate injection of the reductant into the exhaust conduit. Since a compressor requires energy to run, this represents an energy saving compared to air-assisted systems. Moreover, some applications such as marine applications do not necessarily have a ready source of compressed air to hand, and thus the use extra, costly components can be avoided. However, the reductant metering device of the reductant dosing system may alternatively be an air-assisted device, i.e. a device that utilizes compressed air to facilitate injection of the reductant. The metering device may be a component of a reductant metering system. Further components of the reductant metering system may include a reductant storage tank, a control unit, and a pressurizing device such as a pump.

Pressurized reductant is supplied to the metering device via a supply channel. The metering device comprises a controllable metering valve for dosing the required amount of reductant to the exhaust system. After passing the metering valve, the reductant is transported along a dosing pipe to a dosing outlet, whereby the reductant is deposited on the distribution device. As previously noted, the metering device may be liquid-only, i.e. airless. Unlike typical airless injectors, the metering device has a length of dosing pipe arranged after the metering valve in the direction of reductant dosage flow. This means that the metering valve may be located remotely from the exhaust system and thus not be exposed to the high temperatures of the exhaust system, thus potentially increasing the operational life of the injector and reducing the need for a cooling system. Because the reductant is preferably dosed in the wake of the turbine, lower reductant pressures are required. If a distribution device is utilized, it is the distribution device and not the dosing outlet of the metering device that disperses the reductant in the exhaust stream. This means that less kinetic energy is required to be supplied to the reductant and lower reductant pressures may be used. Thus, pumps of simpler, more robust construction may be used in the metering system.

Since the dosing outlet of the metering device is not required to form an aerosol from the reductant, it can comprise fewer, larger orifices as compared to prior art nozzle heads. For example, it may comprise one or more orifices. This reduces the risk of the orifices being blocked by for example urea deposits. The dosing outlet may have a surface that forms a mating surface with the receiving surface of the distribution device in order to prevent leakage of reductant and assist deposition of reductant to the receiving surface of the distribution device.

The reductant distribution device comprises a receiving surface, and at least one distribution surface. The distribution device may be an integral part of the turbocharger turbine shaft or hub, i.e. be manufactured integrally with the turbine shaft, hub or rotor. Alternatively, the reductant distribution device may comprise a fastening surface by which it may be fixedly attached to the turbine shaft, hub or rotor using nay means known in the art. Such fastening means are for example disclosed in WO 2018/080371 which is herein incorporated by reference. The distribution device may be constructed from any suitable material, such as steel or aluminium.

The receiving and distribution surfaces are arranged together with the metering device to avoid any reductant coming into contact with the turbine blades and especially the turbine bearings.

The distribution device may be shaped as a cup, for example a bell-cup or conical cup, and function as a rotating cup atomizer. In this case, the dosing outlet of the metering device may be arranged centrally within the cup. The reductant is deposited on the base or lower side wall of the cup. The spinning motion of the cup combined with the angle of the cup wall causes the reductant to be forced upwards and outwards from the base of the cup towards the outer rim of the cup, which acts as a distribution surface and disperses reductant into the exhaust stream.

Other means of forming a distribution device and means of interaction between the distribution device and metering device may be considered. Such means are disclosed in WO 2018/080371 which is herein incorporated by reference.

A stopping device may be located in the turbine housing. Such a stopping device prevents the turbine from escaping the turbine housing or dismounting the turbine shaft in the event of failure, and may essentially abut the distribution device. If such a stopping device is present, the dosing pipe of the metering device may be pass through or be integrated in the body of the stopping device, or may constitute a stopping device.

A wastegate outlet arranged in the turbine housing may supply hot exhaust gases bypassing the turbine to the outer surface(s) of the diffusor, i.e. the opposite sides to the inner surfaces. By directing hot wastegate exhaust gases along the outer surfaces of the diffusor, the reductant evaporation functioning of the diffusor is even further enhanced. The diffusor may be partially or fully integrated with the turbine housing.

The invention will now be described in more detail with reference to certain exemplifying embodiments and the drawings. However, the invention is not limited to the exemplifying embodiments discussed herein and/or shown in the drawings, but may be varied within the scope of the appended claims. Furthermore, the drawings shall not be considered drawn to scale as some features may be exaggerated in order to more clearly illustrate certain features.

FIG. 1 shows schematically a side view of a vehicle 1 according to an embodiment of the invention. The vehicle 1 includes a combustion engine 2, a first exhaust conduit 4 leading to a turbocharger 5, and a second exhaust conduit leading from the turbocharger 5 to an SCR catalyst 10. A reductant metering device 26 is arranged in conjunction with the turbocharger 5. The vehicle 1 may be a heavy vehicle, e.g. a truck or a bus. The vehicle 1 may alternatively be a passenger car. The vehicle may be a hybrid vehicle comprising an electric machine (not shown) in addition to the combustion engine 2.

Figure 2:
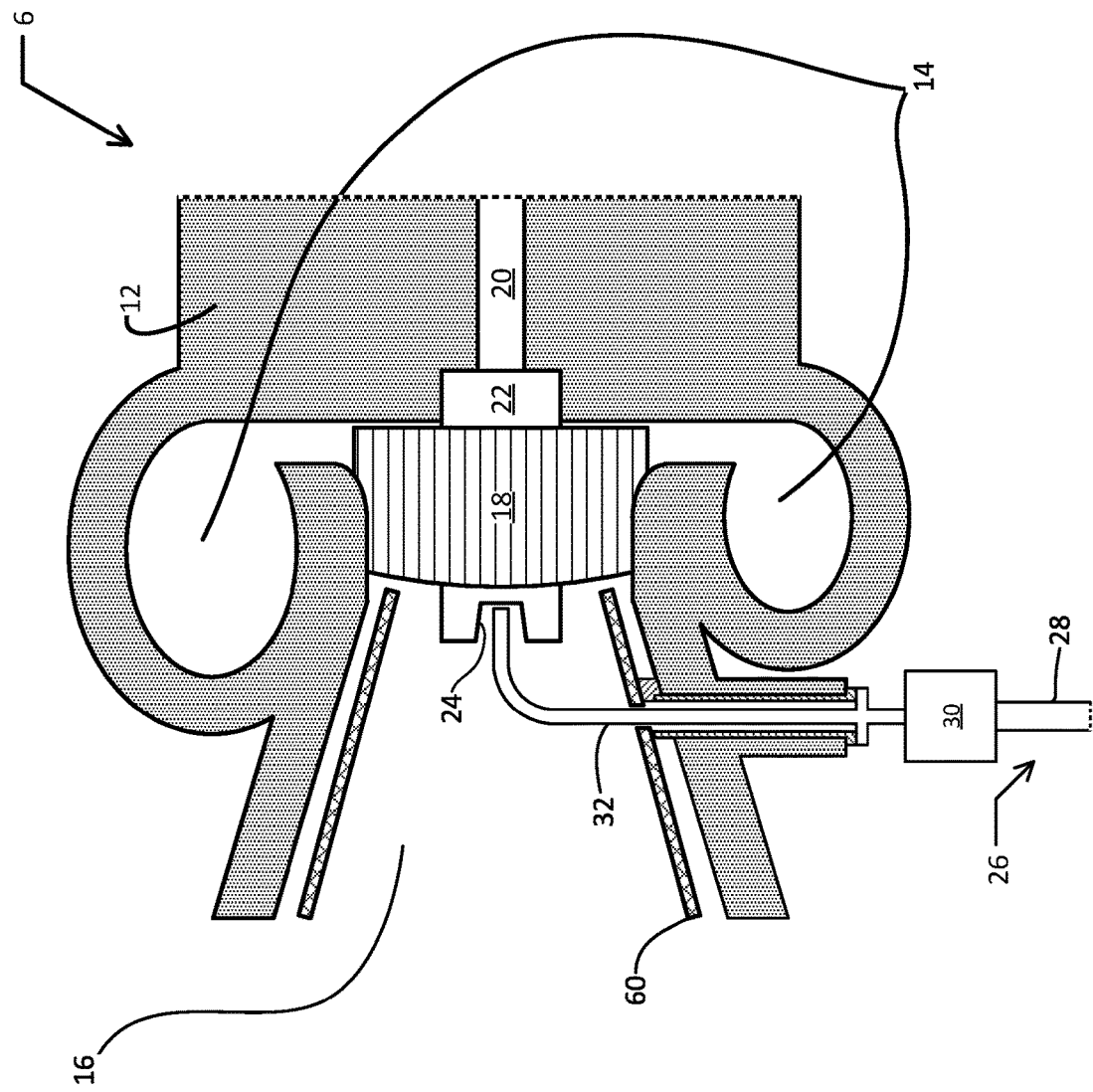
FIG. 2 schematically illustrates an exhaust additive dosing system according to an exemplifying embodiment of the present invention.

FIG. 2 schematically illustrates an exhaust additive dosing system according to an exemplifying embodiment of the present invention.

A turbocharger turbine 6 is shown in cross-section, the turbine 6 comprising a turbine housing 12. The turbine housing 12 comprises exhaust gas inlets 14 and exhaust gas outlet volume 16. Located in the turbine housing 12 is a turbine rotor 18 arranged to rotate on a turbine shaft 20. A sealing member 22 prevents lubricant from leaking out from the turbine bearings (not shown), as well as preventing exhaust gas from leaking in. A reductant distribution device 24 is arranged on the outlet end of the shaft 18, manufactured integrally with the rotor 18. A reductant metering device 26 is arranged in the exhaust gas outlet volume 16 of the turbine 6. The reductant metering device 26 comprises a supply channel 28, a metering valve 30 and a dosing pipe 32.

In operation, the distribution device 24 spins in unison with the turbine rotor 18 and shaft 20 whenever exhaust gas passes through the turbine 6. Reductant such as urea solution, upon being deposited to the distribution device 24 from the metering device 26, is dispersed in the exhaust gas passing through the turbine 6 by the spinning motion of the distribution device 24.

A diffusor 60 is arranged in the exhaust gas outlet volume 16 to prevent corrosive reductant from coming into contact with the walls of the turbine housing 12. In order to be able to provide reductant to the distribution device 24, the outlet of the dosing pipe 32 must be arranged in conjunction with the distribution device. This is achieved by providing an orifice in both the diffusor 60 and the turbine housing 12 through which the dosing pipe 32 may pass.

Figure 3:
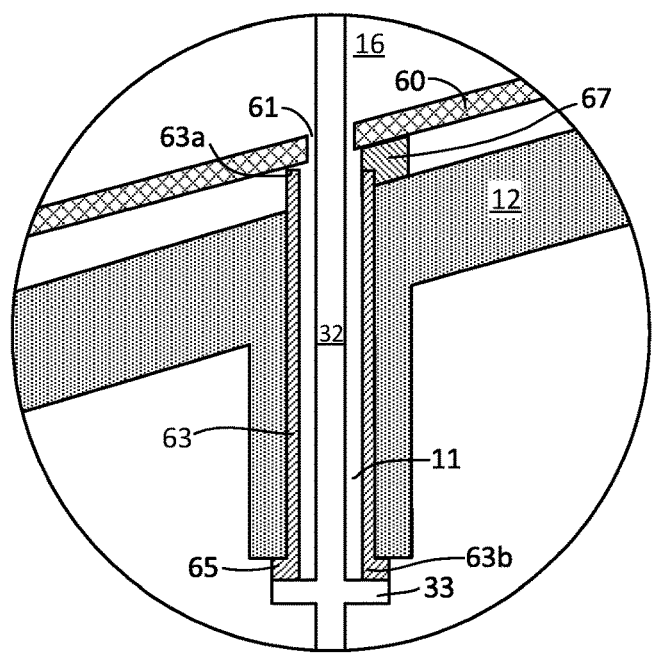
FIG. 3 schematically illustrates an enlargement of the interface between the dosing pipe and the orifices.

FIG. 3 provides an enlarged schematic view of the area where the dosing pipe 32 traverses the diffusor 60 and turbine housing 12. It can be seen that an orifice 61 is provided in the diffusor 60 and another orifice 11 is provided in the wall of the turbine housing 12 in order that the dosing pipe 32 may access the exhaust gas outlet volume 16. Sealing is required for such an arrangement in order to prevent reductant from leaking through diffusor orifice 61 and coming into contact with turbine housing 12. It is however difficult for many reasons to provide a seal between the dosing pipe 32 and diffusor 60. This problem is solved by lining the housing orifice 11 with a bushing 63. The bushing 63 extends at a first end 63a to the diffusor 60 to provide a sealable interface with the diffusor 60. The bushing 63 has an internal diameter greater than the diameter of diffusor orifice 61, so that any reductant passing through orifice 61 is collected within the bushing 63. The interface between the bushing 63 and diffusor 60 may be further sealed in order to avoid leakage. In the illustrated exemplifying embodiment a more complete seal is achieved with the assistance of a sealing element 67, although other means are envisaged. The second end 63b of the bushing 63 is arranged to provide a sealable interface with the dosing pipe 32. In the illustrated exemplifying embodiment this is achieved by providing the bushing 63 with a bushing flange 65 at the second end 63b, and providing the dosing pipe 32 with a pipe flange 33. The pipe flange 33 and bushing flange 65 together form a seal, preventing leakage of the contents of the bushing 63. The bushing flange 65 also assists in correct insertion of the bushing 63 within the exhaust gas outlet volume 16. Using such an arrangement, any reductant leaking through orifice 61 will be collected in the volume defined by the bushing 63 and pipe flange 33. Thus, leaking reductant cannot come into contact with the turbine housing 12. Moreover, since this volume is open to the exhaust gas outlet volume 16, any reductant collected in this volume will be rapidly evaporated and conveyed with exhaust gas to downstream components of the exhaust gas aftertreatment system.

Figure 4:
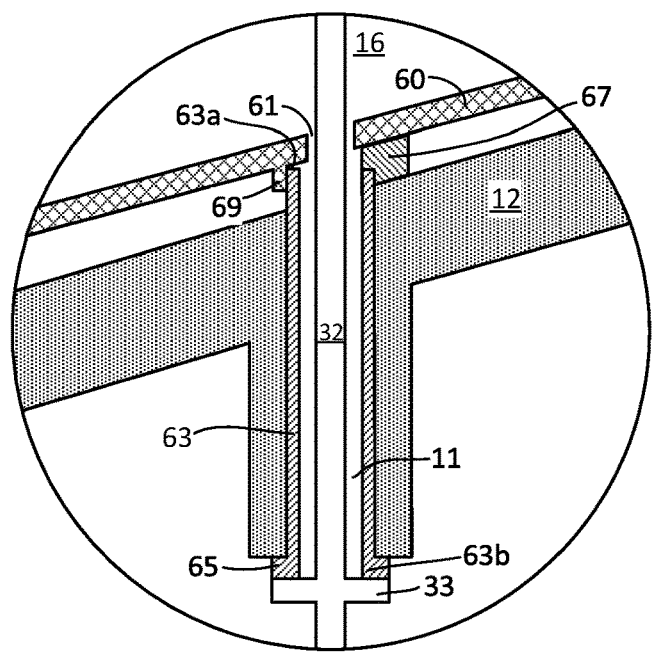
FIG. 4 schematically illustrates an alternative exemplifying embodiment for sealing between the diffusor and bushing.

FIG. 4 schematically illustrates an alternative means of sealing between the diffusor 60 and bushing 63. The diffusor 60 is equipped with an orifice collar 69 which may assist in sealing between the diffusor 60 and bushing 63 at the first end 63a. The orifice collar 69 may extent partly around the end of the bushing 63, as illustrated, or fully around the end of the bushing 63. If the orifice collar extends only partially around the bushing 63 it may be used in conjunction with a sealing element 67 as illustrated to gain an improved seal between bushing 63 and diffusor 60.

Figure 5:
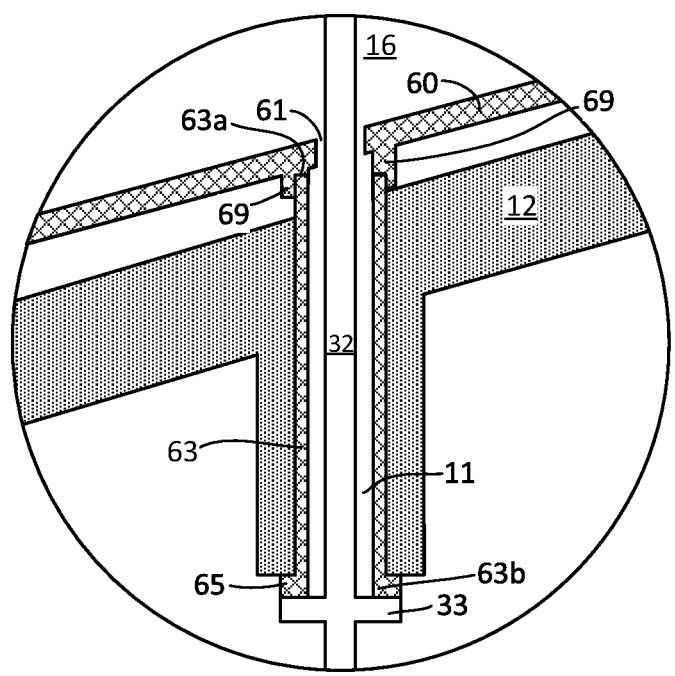
FIG. 5 schematically illustrates a further exemplifying embodiment for sealing between the diffusor and bushing.

FIG. 5 schematically illustrates an exemplifying embodiment that does not comprise a sealing element. An orifice collar 69 extends fully around the first end 63a of the bushing 63 and is arranged to provide a labyrinth seal between the bushing 63 and diffusor 60.

The invention claimed is:

1. An exhaust additive dosing system for an exhaust system for an internal combustion engine, the exhaust additive dosing system comprising:
   a turbocharger comprising a turbine, wherein the turbine comprises:
      a diffusor;
      a turbine housing comprising an exhaust gas outlet volume, and the diffusor is arranged in the exhaust gas outlet volume, wherein a housing orifice and a diffusor orifice are arranged through each of the turbine housing and diffusor respectively, and wherein the housing orifice and diffusor orifice are mutually aligned to provide an opening into the exhaust gas outlet volume; and
      a bushing arranged within the housing orifice extending towards the diffusor orifice and ending at a first end in association with the diffusor orifice, and wherein the first end of the bushing has an internal diameter that is greater than or equal to a diameter of the diffusor orifice; and
   an exhaust additive metering device comprising:
      a dosing pipe arranged to supply exhaust additive to the exhaust gas outlet volume of the turbocharger, wherein the dosing pipe comprises a surface arranged to sealably interact with a surface of the bushing.

2. The exhaust additive dosing system according to claim 1, wherein the diffusor comprises an orifice collar arranged to partially or fully encircle the diffusor orifice and arranged to interface with an outer wall of the bushing.

3. The exhaust additive dosing system according to claim 2, wherein the orifice collar is arranged to provide a labyrinth seal between the diffusor and the first end of the bushing.

4. The exhaust additive dosing system according to claim 1, further comprising a sealing element arranged to provide a seal between the diffusor and the first end of the bushing.

5. The exhaust additive dosing system according to claim 3, wherein the sealing element is adapted to provide a labyrinth seal between the diffusor and the bushing.

6. The exhaust additive dosing system according to claim 1, further comprising a distribution device arranged on a shaft, hub or rotor of the turbine.

7. The exhaust additive dosing system according to claim 6, wherein the distribution device is manufactured integrally with the shaft, hub or rotor of the turbine.

8. The exhaust additive dosing system according to claim 1, wherein the bushing is manufactured of stainless steel.

9. The exhaust additive dosing system according to claim 1, wherein the turbine housing is manufactured of cast iron.

10. The exhaust additive dosing system according to claim 1, wherein the bushing comprises a bushing flange arranged at a second end of the bushing, the second end being arranged opposite to the first end.

11. The exhaust additive dosing system according to claim 10, wherein the bushing flange is adapted at a first face to interface with the turbine housing such that displacement of the bushing further into the exhaust gas outlet volume is prevented.

12. The exhaust additive dosing system according to claim 10, wherein the dosing pipe comprises a pipe flange arranged to sealably interact with a second face of the bushing flange, the second face of the bushing flange being arranged opposite the first face of the bushing flange.

13. The exhaust additive dosing system according to claim 1, wherein the exhaust additive dosing system further comprises a distribution device arranged on a shaft, hub, or rotor of the turbine, and wherein the exhaust additive metering device is arranged to supply exhaust additive to the exhaust additive distribution device.

14. A vehicle, comprising an exhaust additive dosing system comprising:
    a turbocharger comprising a turbine, wherein the turbine comprises:
        a diffusor;
        a turbine housing comprising an exhaust gas outlet volume, and the diffusor is arranged in the exhaust gas outlet volume, wherein a housing orifice and a diffusor orifice are arranged through each of the turbine housing and diffusor respectively, and wherein the housing orifice and diffusor orifice are mutually aligned to provide an opening into the exhaust gas outlet volume; and
        a bushing arranged within the housing orifice extending towards the diffusor orifice and ending at a first end in association with the diffusor orifice, and wherein the first end of the bushing has an internal diameter that is greater than or equal to a diameter of the diffusor orifice; and
    an exhaust additive metering device comprising:
        a dosing pipe arranged to supply exhaust additive to the exhaust gas outlet volume of the turbocharger, wherein the dosing pipe comprises a surface arranged to sealably interact with a surface of the bushing.

15. The vehicle according to claim 14, wherein the diffusor of the exhaust additive dosing system comprises an orifice collar arranged to partially or fully encircle the diffusor orifice and arranged to interface with an outer wall of the bushing.

16. The vehicle according to claim 15, wherein the orifice collar is arranged to provide a labyrinth seal between the diffusor and the first end of the bushing.

17. The vehicle according to claim 14, wherein the exhaust additive dosing system further comprises a sealing element arranged to provide a seal between the diffusor and the first end of the bushing.

18. The vehicle according to claim 17, wherein the sealing element is adapted to provide a labyrinth seal between the diffusor and the bushing.

19. The vehicle according to claim 14, wherein the exhaust additive dosing system further comprises a distribution device arranged on a shaft, hub or rotor of the turbine.

20. The vehicle according to claim 19, wherein the distribution device is manufactured integrally with the shaft, hub or rotor of the turbine.

\* \* \* \* \*